US006760340B1

(12) United States Patent
Banavar et al.

(10) Patent No.: US 6,760,340 B1
(45) Date of Patent: Jul. 6, 2004

(54) MESSAGE SEQUENCING FOR ORDERED MULTICASTING OF A MESSAGE ACROSS A ROUTING NETWORK

(75) Inventors: Guruduth Somasekhara Banavar, Yorktown Heights, NY (US); Tushar Deepak Chandra, New York, NY (US); Kevan Lee Miller, Danbury, CT (US); Robert Evan Strom, Ridgefield, CT (US); Daniel Charles Sturman, Englewood, NJ (US); Michael James Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,530

(22) Filed: Mar. 30, 1999

(51) Int. Cl.[7] ................................................ H04L 12/28
(52) U.S. Cl. ........................ 370/408; 370/411; 370/394
(58) Field of Search ................................. 370/256, 285, 370/394, 401, 402, 408, 400, 390, 411

(56) References Cited

U.S. PATENT DOCUMENTS

| 5,257,369 A | 10/1993 | Skeen et al. ................. 395/650 |
|---|---|---|
| 5,325,362 A | 6/1994 | Aziz .......................... 370/94.3 |
| 5,517,562 A | 5/1996 | McConnell ................... 379/207 |
| 5,522,046 A | 5/1996 | McMillen et al. ..... 395/200.15 |
| 5,555,244 A | 9/1996 | Gupta et al. ................ 370/60.1 |
| 5,557,798 A | 9/1996 | Skeen et al. ................. 395/650 |
| 5,570,366 A | 10/1996 | Baker et al. ............. 370/85.13 |
| 5,581,764 A | 12/1996 | Fitzgerald et al. .......... 395/703 |
| 5,604,837 A | 2/1997 | Tanaka ................... 395/200.13 |

OTHER PUBLICATIONS

Hanson et al., "A Predicate Matching Algorithm for Database Rule Systems", Published at Proceedings of SIGMOID, pp. 271–280 (1991).

Mishra et al., "Consul: A Communication Substrate for Fault–Tolerant Distributed Programs", TR91–32, Department of Computer Science, The University of Arizona, pp. 1–33 (Nov. 1991).

Smirnov, M.I., "Object–Oriented Framework for a Scalable Multicast Call Modelling", Teleservices and Multimedia Communications Second International COST 237 Workshop, Proceedings, Springer–Verlag, vii+277, pp. 1–39 (1996).

Hofmann, M., "A Generic Concept for Large–Scale Multicast", Broadband Communications, Network, Services, Applications, Future Directions, International Zurich Seminar on Digital Communications, IZS '96, Proceedings, Springer–Verlang, xiv+358, pp. 95–106 (1996).

(List continued on next page.)

Primary Examiner—Wellington Chin
Assistant Examiner—Brenda Pham
(74) Attorney, Agent, or Firm—Douglas W. Cameron, Esq.; Kevin P. Radigan, Esq.; Heslin Rothenberg Farley & Mesiti P.C.

(57) ABSTRACT

A technique for reliably multicasting a message within a router network in a sequenced order with other messages is provided. At least one special router in the network has associated persistent storage for sequencing a message being routed to one or more clients. When a message is received at this sequencer node, the sequencer places a sequence number for the message in persistent storage and sends a sequencing acknowledgment back to those routers to which the message was originally routed, as well as back towards the source of the message. The sequencer acknowledgment includes the message id, and the sequencing number. When the sequencer acknowledgment is received by a router, it looks up the routing information from the original message, and sends the acknowledgment to those neighboring routers to which the original message was sent, excluding the link from which the sequencer acknowledgment was received. If the original message corresponding to the sequencer acknowledgment was buffered at this router waiting to be delivered, the message is then delivered to its client nodes.

26 Claims, 8 Drawing Sheets-

OTHER PUBLICATIONS

Zabele et al., "High Performance Infrastructure For Visually-Intensive CSCW Applications", Transcending Boundaries, CSCW '94, Proceedings of the Conference on Computer Supported Cooperative Work, ACM, xi+464, pp. 395–403 (Oct. 1994) (Abstract Only).

K.P. Birman, "The Process Group Approach to Reliable Distributed Computing", Communications of the ACM, vol. 36, No. 12, (Dec. 1993), pp. 37–53.

Oki et al., "The Information Bus—An Architecture for Extensible Distribued Systems", SIGOPS '93, ACM 0-89791-632-8/93/0012, (1993), pp. 58–68.

D. Powell, "Group Communication", Communications of the ACM, vol. 39, No. 4; (Apr. 1996), pp. 52–100.

M.I. Smirnov, "Efficient Multicast Routing in High Speed Networks", IN Comput Commun. (UK), vol. 19, No. 1, Elsevier, (Jan. 1996), pp. 59–75, 45 REF. (Abstract Only).

M. Grossglauser, "Optimal Deterministic Timeouts for Reliable Scalable Multicast", 0743–166X/96, 1996 IEEE, pp. 1425–1432.

| MESSAGE ID | MESSAGE | CLIENTS |
|---|---|---|
| 13524 | XXXXXXXX | 203, 458 |
| 3238 | ABCDEFGF | 300 |
| ⋮ | ⋮ | ⋮ |

| MESSAGE ID | SEQUENCE NUMBER |
|---|---|

MESSAGE SEQUENCING FOR ORDERED MULTICASTING OF A MESSAGE ACROSS A ROUTING NETWORK

CROSS-REFERENCE TO RELATED APPLICATIONS

This application contains subject matter which is related to the subject matter of the following United States patent applications, which are assigned to the same assignee of this application. Each of the below-listed applications is hereby incorporated herein by reference:

"Routing Messages Within A Network Using The Data Content Of The Message," by Chandra et al., filed Nov. 20, 1997, Ser. No. 08/975,303;

"Message Logging For Reliable Multicasting Across A Routing Network," by Banavar et al., co-filed herewith, Ser. No. 09/281,421;

"Quiescent Reconfiguration Of A Routing Network," by Miller et al., co-filed herewith, Ser. No. 09/282,101; and "Non-Disruptive Reconfiguration Of A Publish/Subscribe System," by Miller et al., co-filed herewith, Ser. No. 09/072,293.

TECHNICAL FIELD

This invention relates in general to multicasting messages within a network and, in particular, to sequencing messages within a routing network to facilitate ordered delivery thereof to one or more clients.

BACKGROUND OF THE INVENTION

Many network environments enable messages to be forwarded from one site within the network to one or more other sites using a multicast protocol. Typical multicast protocols send messages from one site to one or more other sites based on information stored within a message header. That is, each message has two components: the message header, which includes the routing information, including destination addresses or a predefined group name that is associated with a fixed list of destinations; and a data content, which is the data of the message. The routing information is read from the message header and is used to send the data content of the message to the specified destinations.

One example of a system that conventionally includes such a network environment is a publish/subscribe system. In publish/subscribe systems, publishers post messages and subscribers independently specify categories of events in which they are interested. The system takes the posted messages and includes in each message header the destination information of those subscribers indicating interest in the particular message. The system then uses the destination information in the message to forward the message through the network to the appropriate subscribers.

In large systems, there may be many subscribers interested in a particular message. Thus, a large list of destinations needs to be added to the message header and used in forwarding the message. The use of the list, which can be even longer than the message itself, can degrade system performance. Other approaches have included the use of multicast groups, in which destinations are bound to a group name, and then that name is included in the message header. The message is then sent to all those destinations bound to the name. This technique has the disadvantage of requiring publishers to send to and subscribers to receive from a static set of groups, which restricts flexibility in many publish/subscribe systems.

DISCLOSURE OF THE INVENTION

A publish/subscribe system consists of a network of message routers (or simply routers) connected via links in an arbitrary graph topology. A number of clients connect to the periphery of this router network and either publish or subscribe to messages. A message consists of a number of attributes, which are name-value pairs. A subscription specifies a predicate on the attributes of messages.

The router network is responsible for routing messages from publishers to interested subscribers based on matching events to subscription predicates. One embodiment of this routing protocol, referred to as content-based routing, is described in the above-incorporated co-pending patent application entitled "Routing Messages Within A Network Using The Data Content Of The Message." Content-based routing proceeds as follows. From each router node at which a publisher is present, the system computes and stores a spanning tree to reach every other node in the network. All published messages from a particular publisher then follow the paths in the corresponding spanning tree, with each router node performing enough matching to determine which of its child routers should receive the published message.

Briefly summarized, the present invention is directed in one aspect to providing a mechanism for sequencing messages for multicasting through content-based subscriptions in a manner which is resilient to failures in the network or routers. Ordering resiliency is achieved by assigning sequencing numbers to messages within the network, and then using the sequencing numbers to order delivery of the messages.

More particularly, provided herein is a method for routing messages within a network. The method includes: receiving a message; sequencing the message at a node of the routing network with other messages received by the routing network to produce an ordering of messages within the routing network for delivery; and delivering the message to one or more clients of the routing network while maintaining the ordering of the message delivery.

In another aspect, a system for routing messages within a routing network is provided which includes means for receiving a message and means for sequencing the message at a node of the routing network with other messages received by the routing network to produce an ordering of message delivery within the routing network. The system also includes means for delivering the message to one or more clients of the routing network while maintaining the ordering of message delivery.

In still another aspect, a system of routing messages within a network is provided. The system includes a routing network adapted to receive a message, and a sequencer node disposed within the network for sequencing the message with other messages received by the routing network to produce an ordering of message delivery within the routing network. The routing network includes one or more routers for delivering the message to one or more clients of the network. The sequencing of the message occurs prior to delivery of the message to the one or more clients of the network and allows the message to be delivered to the one or more clients while maintaining the ordering of message delivery.

In a further aspect, an article of manufacture is provided which includes at least one computer usable medium having computer readable program code means embodied therein for effecting routing of messages within the network. The computer readable program code means in the article of manufacture includes: computer readable program code means for causing a computer to effect receiving a message; computer readable program code means for causing a computer to effect sequencing the message at a node of the routing network with other messages received by the routing network to produce an ordering of message delivery within the routing network; and computer readable program code means for causing a computer to effect delivering the message to one or more clients of the network while maintaining the ordering of message delivery.

To restate, provided herein is a technique for sequencing messages within a routing network itself to ensure reliable multicasting of messages across the network in a totally ordered manner. Although principally described herein in connection with data-content routing of messages, the sequencing technique can be applied to other routing systems, e.g., subject-based routing. A system implementing the sequencing technique of the present invention allows senders and receivers to connect anywhere in the network regardless of the location of the sequencer. Again, sequencing of messages occurs within the network itself between the sender and the one or more clients to which the message is directed. The sequencing technique described herein allows a sender or receivers to choose whether ordering of messages is required by either the sender or the receivers. This choice allows a tradeoff of system resources versus quality of service.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As noted above, the present invention is in one aspect an extension of the routing capability disclosed in the above-incorporated application wherein messages are routed in a network based on the content of the data within the message. In particular, a message does not need to include destination information, such as destination addresses or a group destination name. Instead, data within the message is used to traverse a data structure to determine the link or links over which the message is to be forwarded in order to reach the consumers (subscribers or clients) interested in the message.

In accordance with the principles of the present invention, this content-based routing capability is enhanced for ordered multicasting of messages. Further, the ordering technique presented herein is resilient to failures in the network, or its routers. The network sequencing approach of this invention may be used in combination with, or separately from, the "reliable routing capability" disclosed in the initially-incorporated co-filed patent application. Whether used in combination with reliable delivery or separately therefrom, a totally ordered multicast in accordance with the principles of this invention may be used with the above-described content-based routing network. However, those skilled in the art will recognize that the sequencing technique presented below for ordering message delivery (notwithstanding a failure within the network) is equally applicable to other routing systems, such as a subject-based routing system.

Figure 1:
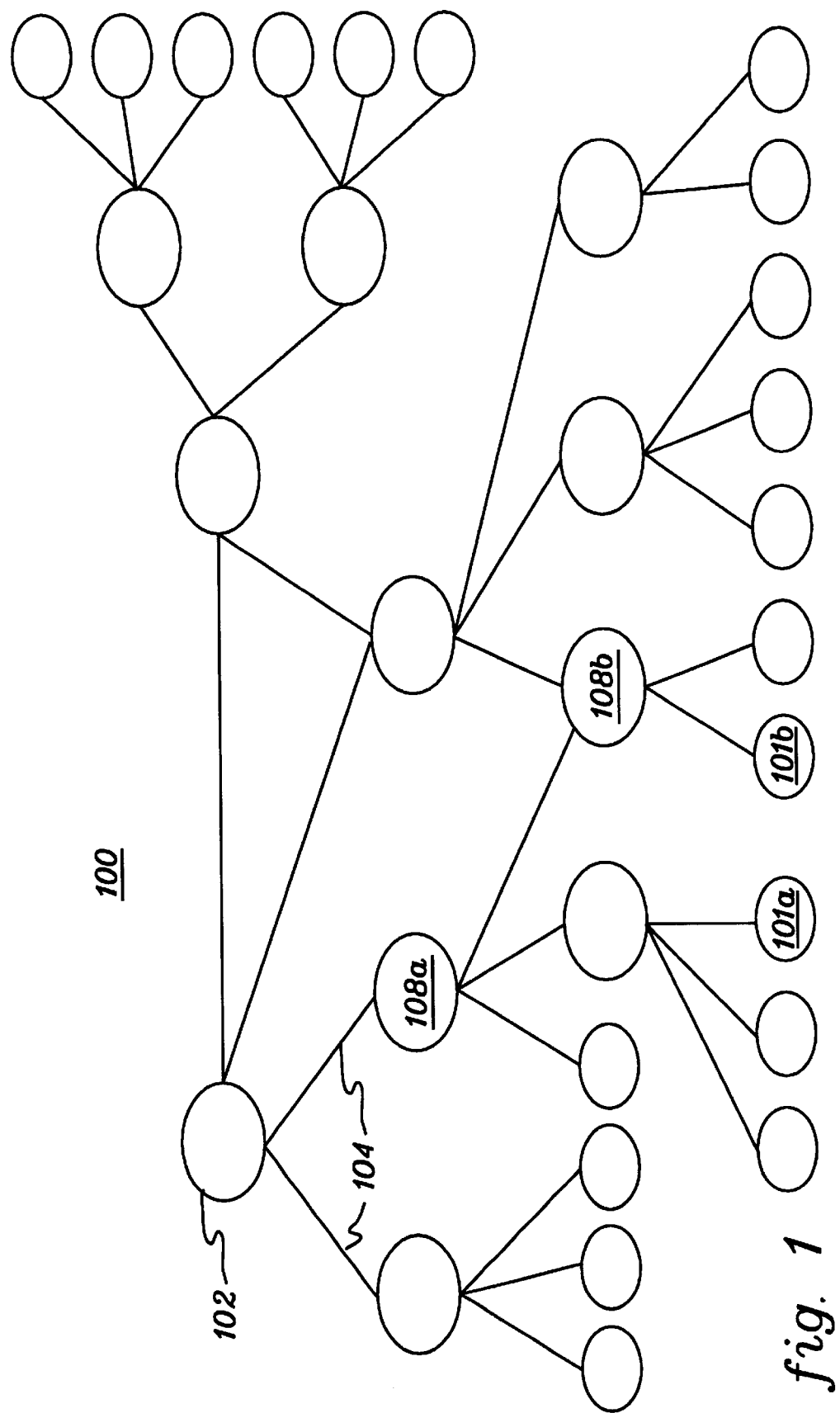
FIG. 1 depicts one example of a distributed network incorporating and using the resilient sequencing capability of the present invention.

One example of a distributed network 100 incorporating and using the ordered routing capability of the present invention is depicted in FIG. 1 and described in detail below. Network 100 includes, for instance, a plurality of computing units 102 coupled to one another by links 104.

Each link couples two computing units in the network, and each computing unit may have any number of links connected to it. Each link is bidirectional, i.e., a computing unit may send and receive messages on the link, is connection oriented, and preserves FIFO order. Each computing unit in the network is either a client computer (represented by the smaller ovals, such as those having addresses 101a, 101b), meaning that it sends messages to the routing network or that it has requested to receive messages whose content satisfies certain properties; or it is a router computer (represented by the larger ovals, such as 108a, 108b), meaning that it forwards messages received on one network link onto other links on the way to the client computer(s). The clients are collectively referred to herein as clients 101 and the routers are collectively referred to as routers 108. (For purposes of this discussion, if a single computing unit serves both as a router and as a client, these two separate functions will be considered as two computing units connected by a link.)

Each computing unit can be any type of computing unit that can be included in a network. For example, it can be an RS/6000 computing node or any other of various types of computing nodes, processors, computers or systems. The network can also include different types of computing units coupled to one another via the links. The links include, for instance, TCP connections over IP links, as only one example.

Distributed network 100 can be included in various systems that require the passing of messages or data. These systems include, for instance, the internet or a content-based publish/subscribe system.

Content-based publish/subscribe systems improve the degree of decoupling between publishers and subscribers. In content-based publish/subscribe systems, subscriptions are specified in terms of predicates on the posted data, rather than in terms of subject identifiers supplied by the publisher. One example of a content-based publish/subscribe system is described in co-pending U.S. patent application Ser. No. 08/975,280, entitled "Method And System For Matching Consumers To Events," Astley et al., which is hereby incorporated herein by reference in its entirety. The examples described herein are with reference to a content-based subscription system. However, these are only examples. The present invention can be employed with other types of systems without departing from the spirit of the present invention.

In one embodiment of the invention, each router 108 of network 100 (FIG. 1) has associated therewith a spanning tree, which lays out the best path (according to some criterion, such as latency) from the router to each client 101. In this embodiment, it is assumed that routers agree on a common criterion for measuring distance between nodes in the network. There may in fact be multiple spanning trees. For example, alternative spanning trees may specify either backup routes, or peak load routes. Herein, it is assumed that one spanning tree is in effect for the routing of any particular message.

Figure 2:
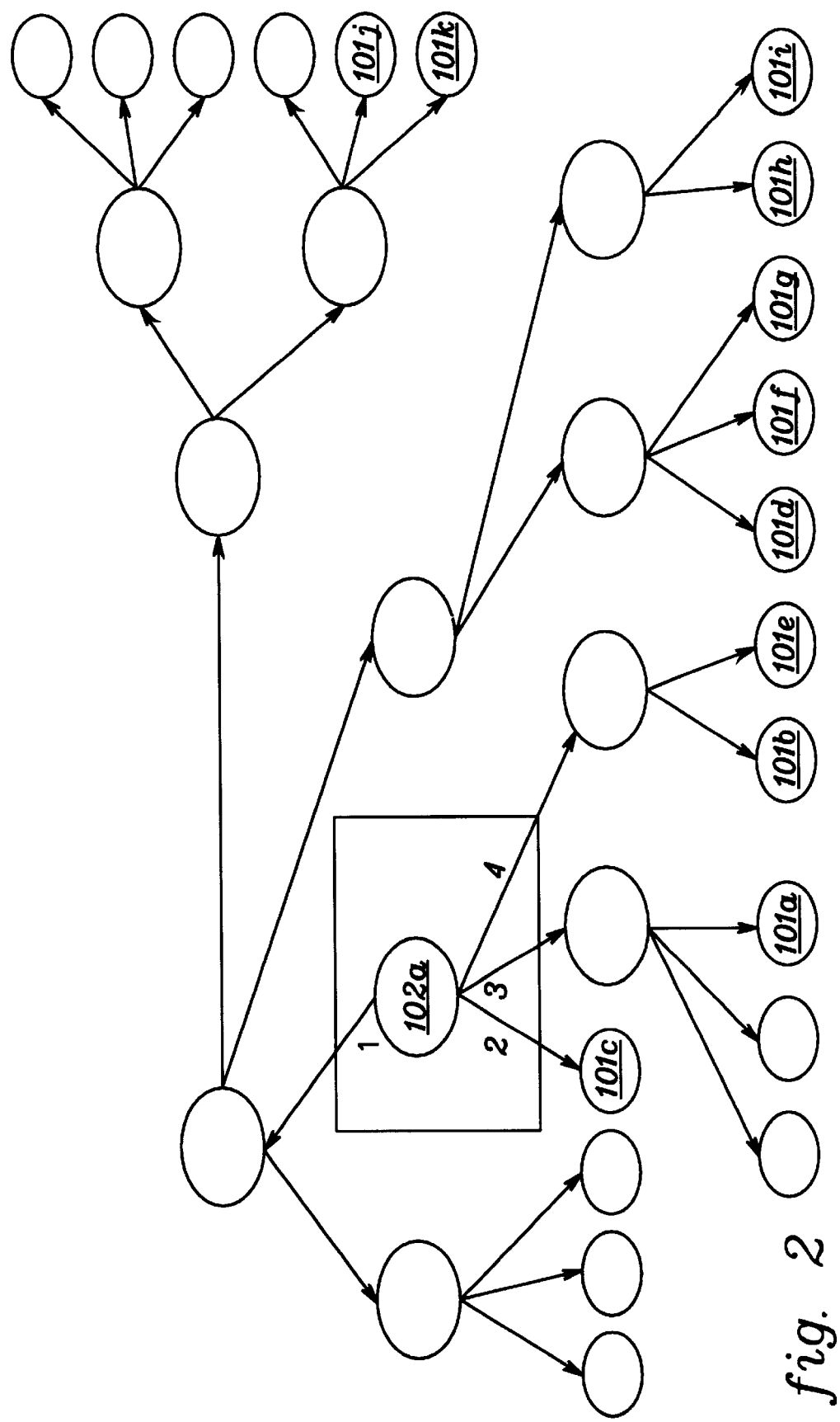
FIG. 2 depicts one example of a spanning tree used in accordance with the principles of the present invention.

One example of a spanning tree, which is associated with router 108*a*, is depicted in FIG. 2. As shown in FIG. 2, there is a path from router 108*a* to every other node in the spanning tree. A message to be routed from router 108*a* to one or more of the other nodes is routed via one or more of the links associated with router 108*a*, i.e., links 1–4. For example, if a message is to be routed from node 108*a* to node 101*c*, then link 2 is used. As a further example, if a message is to be forwarded toward client 101*a*, then link 3 is used.

One embodiment for building a spanning tree from a network topology, that is an arbitrary graph, is described in detail in *Introduction to Algorithms*, by Cormen, Leiserson, Rivert, Chapter 24, pp 498–513, Published by MIT Press (1990), which is hereby incorporated herein by reference in its entirety.

In addition to the spanning tree associated with each router, each router has a routing table. The routing table includes an entry for each client computer in the network. Each entry of the routing table associates a client address with the identifier of the network link constituting the next segment on the path in the spanning tree from the router to the client. For a router with d network links, each such link identifier is an integer between 1 and d. For instance, the client having address 101*a* has a corresponding link identifier of 3 (see FIG. 2).

Each routing table is constructed via information from the network topology (e.g., the client addresses) and hence from the corresponding spanning tree (e.g., the link identifiers), in a known manner.

Figure 3:
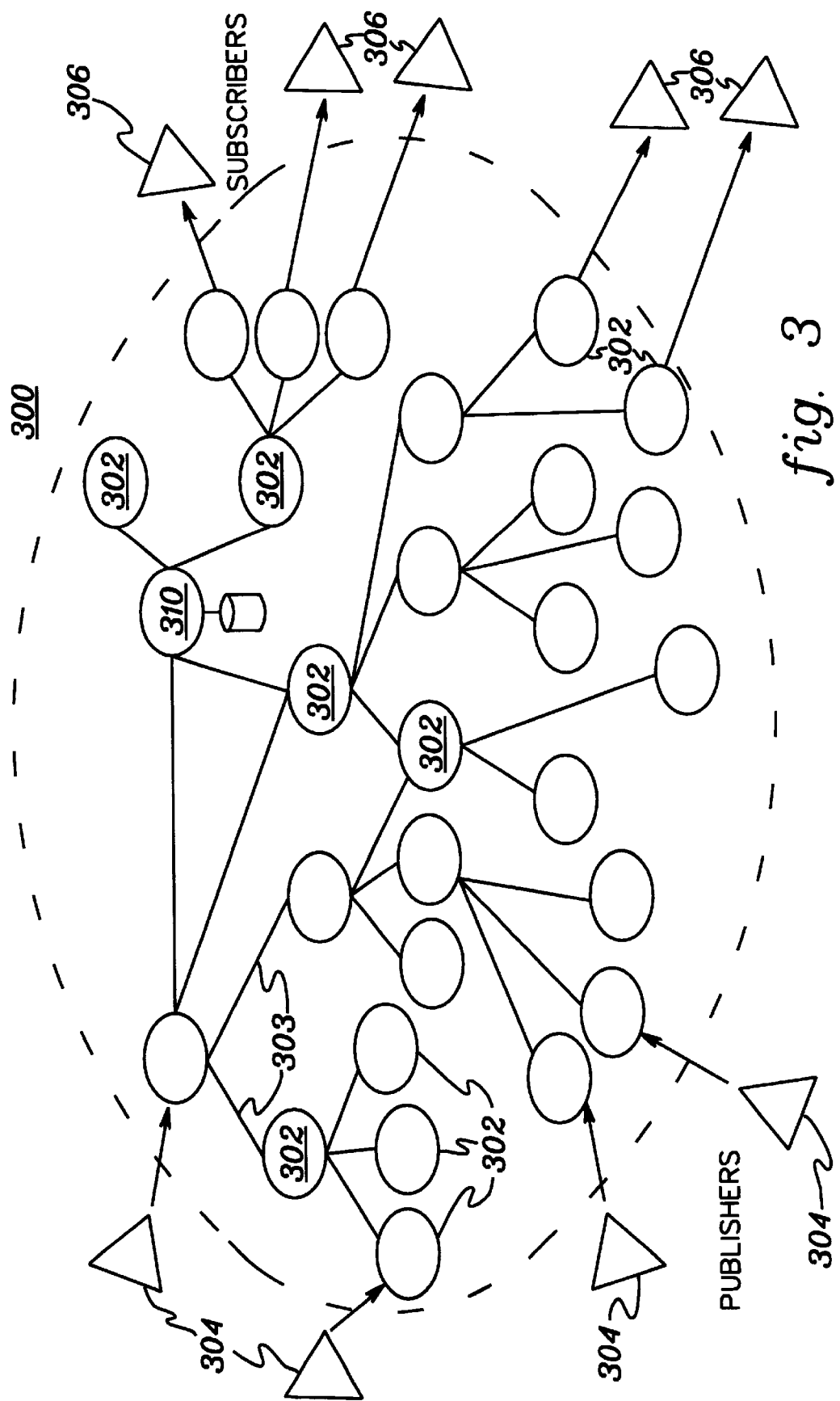
FIG. 3 depicts one embodiment of a distributed router network configured with the resilient sequencing capability of the present invention.

By way of example, FIG. 3 depicts one embodiment of a publish/subscribe system, generally denoted 300, to employ ordered message routing in accordance with the principles of the present invention. System 300 includes a network of routers 302 connected via links 303 in an arbitrary graph topology. A number of clients connected to the periphery of this router network either publish or subscribe to messages. Those clients publishing messages comprise publishers 304, while those clients subscribing to messages comprise subscribers 306. The router network is responsible for routing messages from a publisher 304 to interested subscribers 306 based on matching events to subscription predicates.

This protocol, known as content-based routing, is described in detail in the initially-incorporated co-pending patent application entitled "Routing Messages Within A Network Using The Data Content Of The Message." Briefly explained, from each router node at which a publisher is present, the system computes and stores a spanning tree to reach every other node in the network. All published messages from the publisher follow the paths in that spanning tree, with each router node performing enough matching to determine which of its child routers should receive the message. All paths preserve a first-in first-out ordering on messages from any one publisher to all subscribers.

The present invention achieves ordering of routed messages by sequencing messages within the router network itself through assignment of a sequence number at a designated node of the network. Publishers and subscribers that need ordering of messages may specify a quality of service parameter herein called "totally ordered" or "total ordering". Total ordering is provided for ensuring ordered delivery of a message to all active subscribers. Further, by assigning sequencing numbers to messages, the order of the messages is preserved notwithstanding failure in the network, for example, at one or more routers or links of the network.

In one implementation, a special router in the router network 300 is designated a sequencing node or sequencer 310. Node 310 supports the ability to sequence messages received into the routing network. When there is at least one subscriber needing total ordering, the routing algorithm guarantees that messages are routed to the sequencer. When totally ordered multicast is required by at least one publisher or subscriber, the routing protocol incorporates message sequencing in accordance with the principles of this invention.

Briefly explained, messages originally sent by a publisher are assigned unique ids by the first router node receiving the message. All routers (including the sequencing node) receiving a published message thereafter note the message's unique message id and the source node (i.e., publisher). Routing information comprising the nodes to which the message will be routed is then computed based on message content and stored, e.g., indexed by using the message id. Routing computation always includes the sequencing node. Messages are then forwarded to applicable neighboring routers and delivered to any subscribing clients to that node not requiring ordered delivery. Messages to the node's subscribing clients requiring ordered delivery (as used herein) are not delivered, but instead are buffered for later delivery as explained further below.

Figure 4:
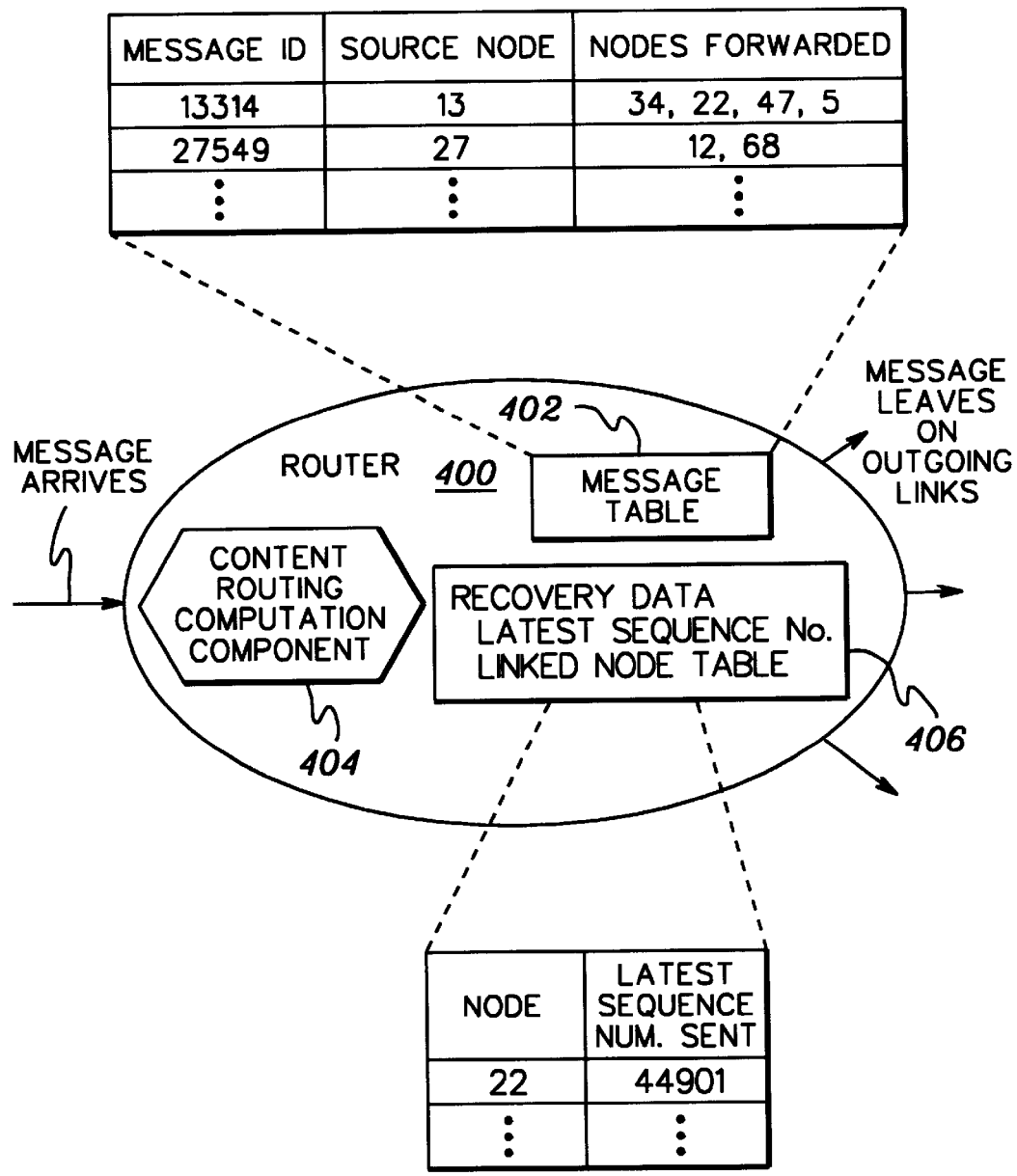
FIG. 4 depicts one embodiment of a router for use in accordance with the principles of the present invention in a router network such as depicted in FIG. 3.

FIG. 4 depicts one embodiment of a router node for use in accordance with the principles of the present invention. When a message arrives at router 400 it is stored into a message table 402 using the unique message identifier. Information stored includes the source node identification as well as the neighboring nodes to which the message is to be forwarded. These neighboring nodes are calculated by a content routing computation 404 after the message has been received. Computation component 404 takes the message and based upon stored subscriptions returns a set of destinations or links upon which the message should be forwarded. Again, in one embodiment, this computation is content dependent and can be accomplished as described in the above-incorporated co-pending application. In accordance with the principles of the present invention, router 400 also includes recovery data, including a latest sequence number received and linked node table 406, which are described further below.

Figures 5, 6, 7:
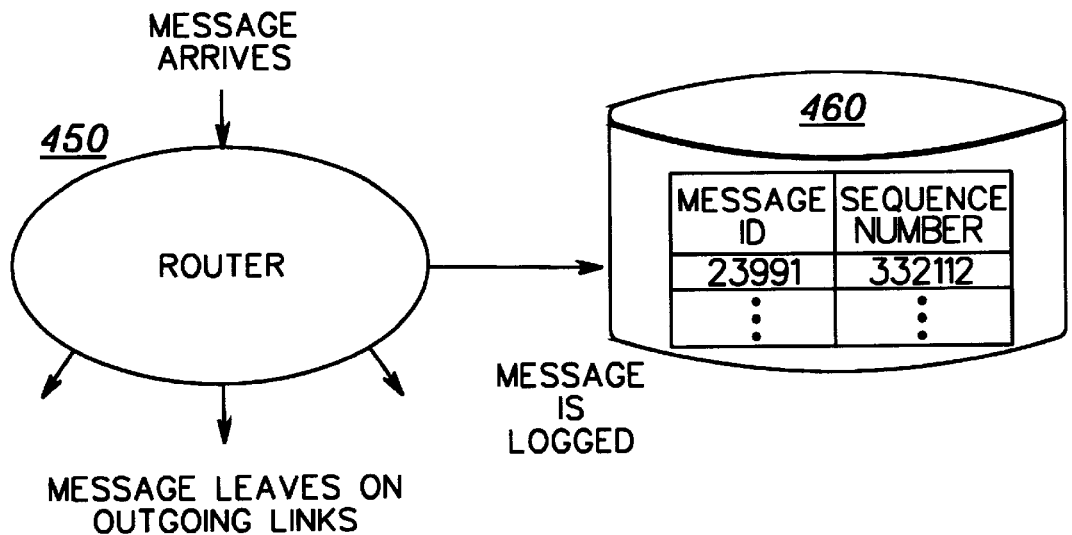
FIG. 5 depicts one example of a router configured as a sequencer with message sequencing capability in accordance with the principles of the present invention.
FIG. 6 depicts one example of a client message buffer used by a router having clients connected thereto in accordance with the principles of the present invention.
FIG. 7 depicts one example of a sequencing acknowledgment (SACK) message sent to a router in accordance with the principles of the present invention.

As noted, pursuant to this invention one router in the network serves as a sequencer node. FIG. 5 depicts one embodiment of a sequencing node or sequencer which comprises a router 450 and persistent or stable storage 460, such as a file system or a database. When a published message is received at the sequencing router, the sequencer performs the following functions in addition to the standard routing functions described above.

1. The message is assigned a next sequencing number in sequence.
2. The sequencing number and message id are written to disk 460.
3. A sequencing acknowledgment (SACK) is sent to those routers to which the message was routed, as well as back towards the source node of the message. A SACK message includes the message id, and the sequencing number as shown in FIG. 7.

When a SACK message is received by a router, it looks up the routing information for the original message, sends the SACK message down the links the original message was sent excluding the link from which the SACK message was received. In addition, the router forwards the SACK towards the source of the original message, and deletes the routing information stored in the message table for that message. If the message table was lost due to the router failing and recovering, the SACK message is forwarded along all links of the spanning tree with the sequencer at the root, excluding the link on which the SACK message was received. Also, if the original message corresponding to the SACK was buffered waiting to be delivered to one or more subscribing clients requiring ordered delivery, the message will now be delivered. Note that first-in first-out (FIFO) ordering on the links between routers preserves the order of SACKs sent from the sequencing router; thus, as soon as a SACK corresponding to a buffered message arrives, that message can be delivered to subscribing clients without waiting for other SACKs.

In support of automatic recovery from failure, the sequencing router stores the message id and corresponding sequence number after assigning the sequence number to the message but before sending the sequencing acknowledgment (SACK) message. Further, each router also stores (pursuant to the present invention) the following information while processing SACK messages.

The latest sequence number that has been received from the sequencing broker.

For each link on which a SACK has been forwarded, the latest sequence number that has been sent.

This information is stored into the SACK tables 406 (FIG. 4) for the router. Since pursuant to this invention FIFO links are assumed between a sequencer and any given router, receiving (or sending) a SACK for a sequencing number N implies that all relevant SACKs for sequencing numbers less than N have also been received (or sent). Note that non-first-in first-out (non-FIFO) links are made FIFO for the present invention, for example, using standard techniques such as the TCP protocol.

As implied in the above description, three processing phases are implemented in one embodiment in accordance with the principles of the present invention. In a first phase, messages are routed from a publisher to all nodes in the network, but not necessarily delivered to all subscribers, depending upon whether ordered delivery has been specified by the publisher or the subscribers. In a second phase, messages are delivered from the routing nodes based upon an acknowledgment received from the sequencer node (i.e., the SACK message). This phase two processing and use of the sequencing router ensures ordered delivery of messages to clients requiring ordered routing. A third phase is entered whenever a node or link fails within the network. This phase involves a request for and a replaying of sequence acknowledgments that were lost due to the failure.

Figure 8:
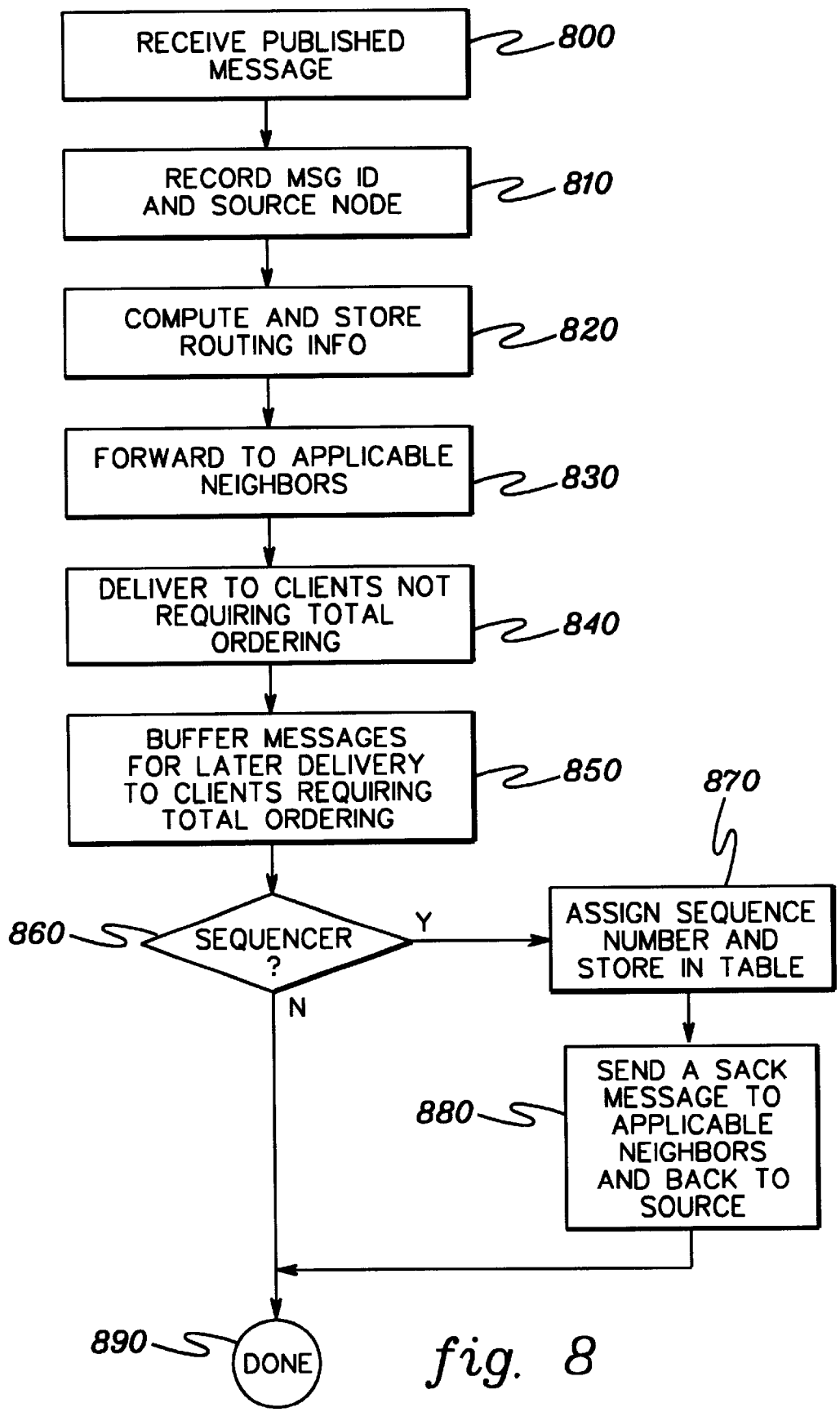
FIG. 8 is a flowchart of one embodiment of a resilient message ordering process in accordance with the principles of the present invention.

FIG. 8 depicts one embodiment of phase one message routing processing in accordance with the present invention. This processing is implemented at each node of the network. At a given node, a published message is received 800 and recorded into the node's message table 402 (FIG. 4) using the message id and source node information provided with the message 810. The node's content routing computation 404 (FIG. 4) next determines neighboring node routing information which is also stored into the message table 820. Again, this computation is based on data content of the message when employing a routing system such as described in the initially-incorporated patent application.

The message is next forwarded to applicable neighboring nodes 830 as determined by the content routing computation, and delivered to subscribing clients not requiring ordered delivery 840. The subscribing clients comprise clients coupled to the particular router node processing the published message. For example, certain subscriber clients to a particular router node may require ordered delivery, while others may not. Thus, the process allows those clients not requiring ordered delivery to immediately receive the published message. Again, as used herein, "ordered delivery" comprises a system guarantee that subscribers who have requested ordered delivery receive the message in an order of receipt at the sequencing node within the routing network, thereby ensuring sequenced delivery of messages to the one or more clients requesting ordered delivery service.

In order to deliver messages to clients requesting ordered delivery, the router node proceeds to buffer the message for later delivery to those clients 850. If the router node is the sequencer 860, the message is assigned a sequencing number and written to disk 870. A sequencing acknowledgment (SACK) is then sent to the applicable neighboring router nodes, as well as back to the source node providing the message now held in the message table 880. This completes 890 this embodiment of the message routing phase.

Figure 9:
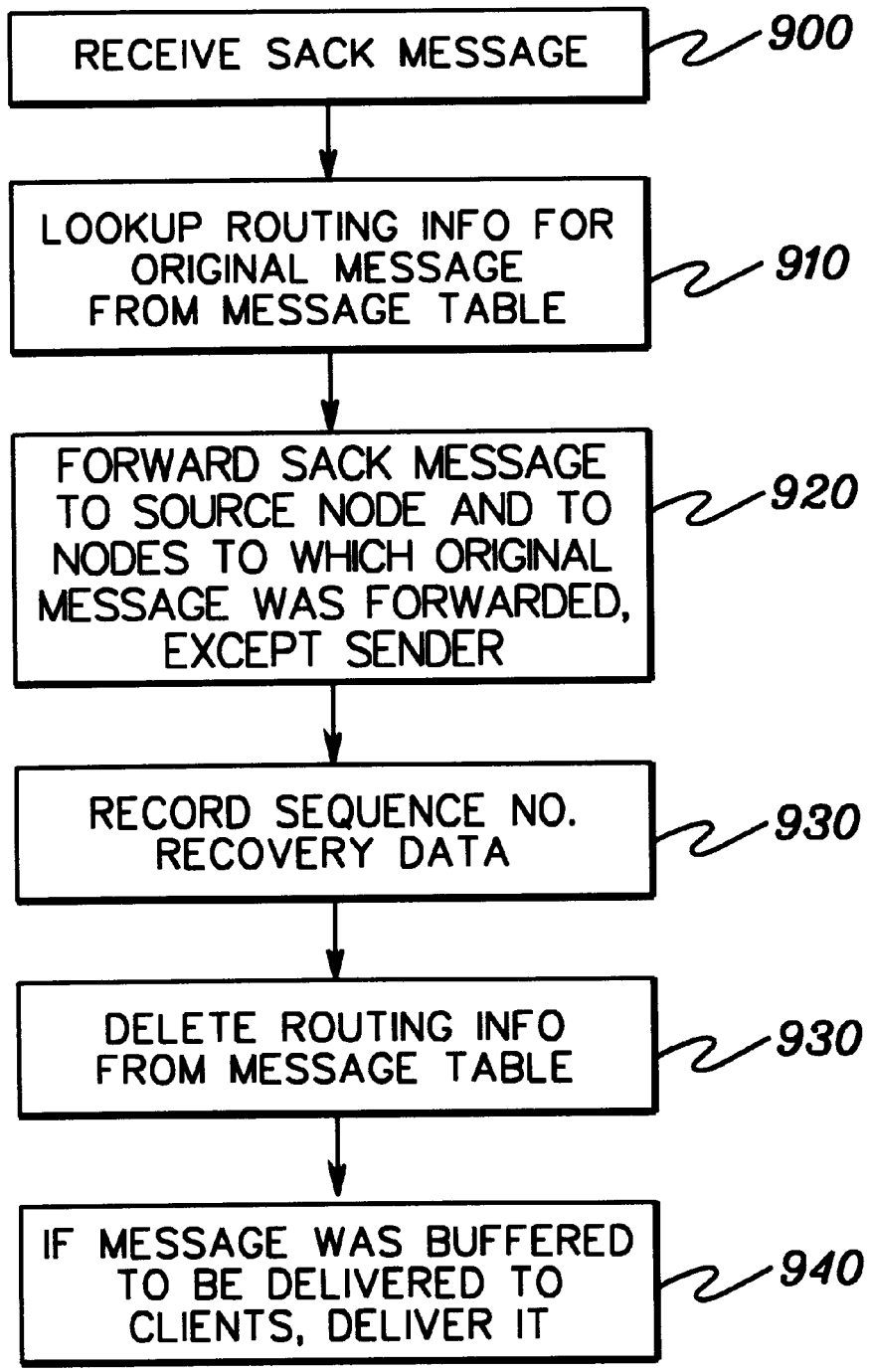
FIG. 9 is a flowchart of one embodiment of sequencing acknowledgment (SACK) processing in accordance with the principles of the present invention.

FIG. 9 depicts an approach for processing SACK messages in accordance with the principles of the present invention. Each router node in the network implements this processing upon receipt of a SACK message 900. First, the routing information for the original message is determined from the node's message table 910. The SACK message is then sent to those nodes where the original message was sent minus the neighboring node from which the SACK message was received and plus the original message's source node 920. The routing information corresponding to this message id is deleted from the node's message table 930, and, if the message was buffered in an ordered delivery table (such as depicted in FIG. 6) for delivery to one or more clients, then the message is now delivered.

Essentially, the process comprises determining whether there is a message id in the ordered delivery table corresponding to the id of the SACK message being processed. If so, then the message is retrieved from the ordered delivery table and delivered to the one or more clients of the node requesting ordered delivery. Thus, ordered delivery means that the message is buffered in the ordered delivery table of the node and then delivered once the sequencing acknowledgment signal is received back from the sequencing node of the network.

In a third phase, a routing system in accordance with the principles of the present invention enters a failure recovery process whenever a outer detects failure of a neighboring node, or the link to a neighboring node. In the following description, the detecting node is referred to as the child node, and the replacement for the failed neighboring node is referred to as the parent node. The detecting child router notifies a configuration manager, which we assume tracks the configuration of the router network. The configuration manager replies with a replacement parent node. This new parent has the same parent and children as the failed node. Implementation of this monitoring for node failure and replacement of a parent node are within the capabilities of one of ordinary skill in the art.

Note that a configuration manager is a "network system service" that is responsible for maintaining information about the structure, function, and status of a network system. This includes information such as the network topology, nodes with certain properties (such as loggers), quality of service offered nodes in the network, etc. A system's configuration may be statically fixed or dynamically changing. A configuration manager may be centralized or distributed. Network system management products such as IBM's Tivoli TME-10 contain configuration management components. From the perspective of the current invention, the system uses the topology information in the configuration manager when nodes or links fail and substitutes nodes to re-establish these failed components.

Figure 10:
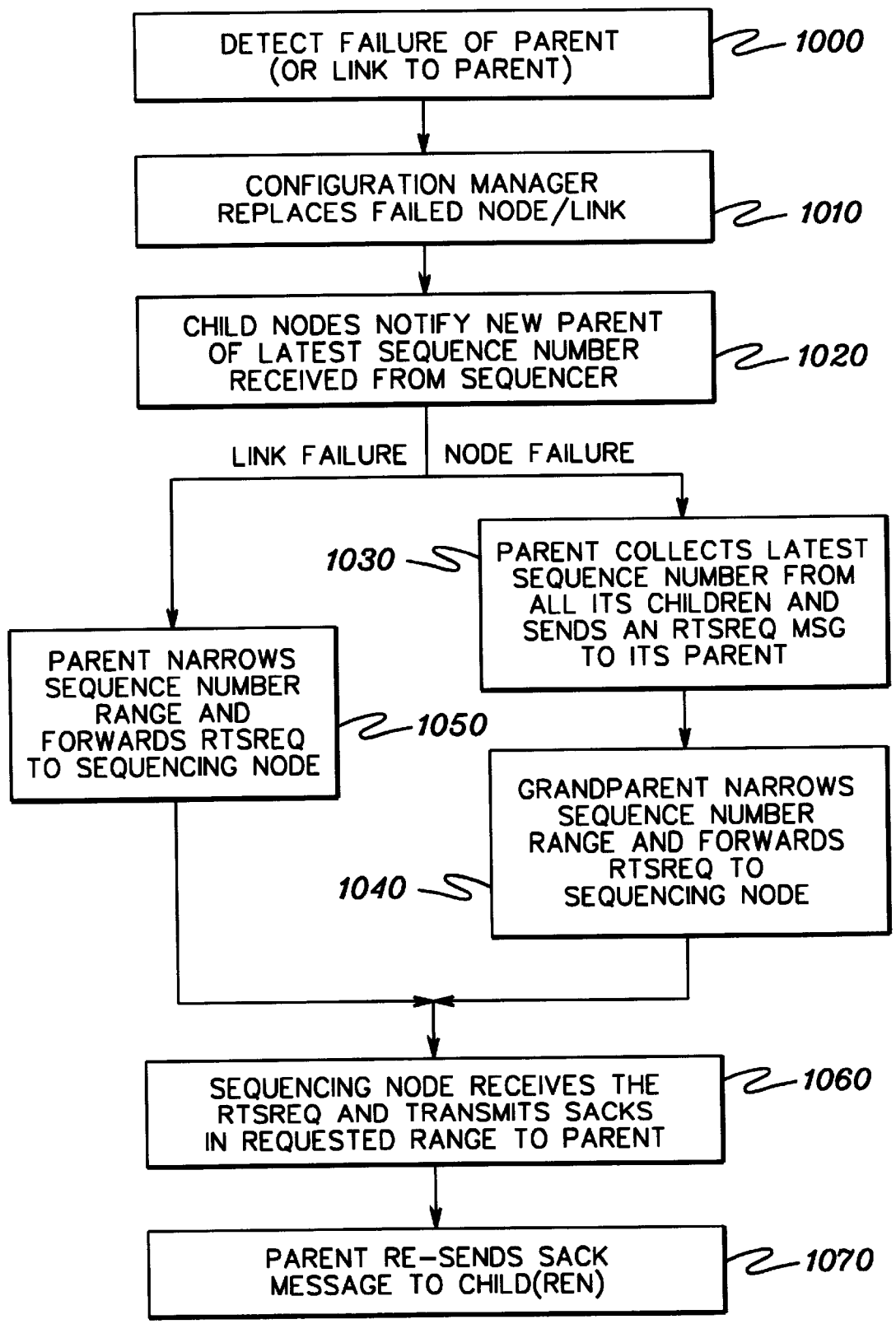
FIG. 10 is a flowchart of one embodiment of processing for failure recovery within the routing network in accordance with the principles of the present invention.

Referring to FIG. 10, in one embodiment, the failure recovery phase of the present invention begins with detection of failure of the parent node, or a link to the parent node 1000. The configuration manager or system replaces the failed node 1010, and child nodes of the failed node notify the new parent of the latest sequence number received from the sequencer of the system 1020. If a node failure, the new parent collects these responses and forwards a request for sequence acknowledgment retransmission (RTSREQ) for SACK messages with sequence numbers greater than the latest received by any child node, to its parent node 1030. Its parent node (i.e., the child's grandparent) narrows the requested sequence number to a range bounded by the latest sequence number in its SACK tables 406 and forwards the RTSREQ to the sequencing node 1040. Alternatively, if the failure is a link failure, the new parent narrows the sequence number range based on the latest sequence number in its own SACK table 406 and forwards a request for sequence retransmission (RTSREQ) to the sequencing node 1050.

Upon receiving an RTSREQ message at the sequencer node, the sequencer retransmits the requested sequence acknowledgments to the new parent 1060. When the new parent receives re-transmitted SACK messages it requested from the sequencing router, it delivers them to the appropriate children nodes 1070. After all such messages have been delivered, the new parent node begins to forward new SACKs to its children, thereby preserving the FIFO property of the protocol.

To summarize, those skilled in the art will note from the above description that in a publish/subscribe system supporting content-based subscription, a method to order messages has been provided in a manner that is resilient to router or link failure. The publish/subscribe system may be realized as a router network connected in an arbitrary graph topology, except that the links from a sequencer node to any router are assumed to be FIFO.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for routing messages within a routing network, said method comprising:

receiving a message;

sequencing the message at a node of the routing network with other messages received by the routing network to produce an ordering of message delivery within the routing network;

delivering said message to one or more clients of said routing network while maintaining said ordering of message delivery; and employing said sequencing of said message to ensure a total ordering quality of service of said message to said one or more clients of said network notwithstanding failure of one or more routers or links within the routing network.

2. The method of claim 1, further comprising initiating said sequencing when a sender of said message or a client of said one or more clients specifies an ordered delivery quality of service for said message.

3. The method of claim 1, wherein said routing network comprises a plurality of routers, and wherein one router of said plurality of routers comprises a sequencing router, said sequencing being performed at said sequencing router of said plurality of routers.

4. The method of claim 3, wherein said sequencing comprises assigning a sequence number to said message at said sequencing router and said delivering comprises delivering said message to said one or more clients of said routing network using said sequencing number assigned to said message.

5. The method of claim 4, wherein said routing network comprises a spanning tree and said sequencing router comprises one node of said spanning tree.

6. The method of claim 1, wherein said routing network comprises a spanning tree having a plurality of routers, said node sequencing said message comprising a sequencing router within said spanning tree, said method further comprising detecting failure of a router within said tree before completing delivery of said message to said one or more clients of said network, thereafter reconfiguring said tree to replace said failed router with a new router, and automatically generating a request for retransmission of a sequencing acknowledgment from said sequencing router, said sequencing acknowledgment being employed to deliver said message in sequence to said one or more clients of said routing network.

7. The method of claim 1, wherein said delivering comprises routing said message to said one or more clients of said routing network based on data content of said message irrespective of any destination information that may be within said message.

8. The method of claim 7, wherein said sequencing comprises sending a sequencing acknowledgment from said node to at least one router of said network routing said message, and upon receipt of said sequencing acknowledgment at said at least one router, delivering said message to a client thereof, said client requiring total ordering of messages.

9. The method of claim 8, further comprising buffering said message at said at least one router of said network routing said message, said buffering occurring prior to said sequencing of said message.

10. A method for routing messages within a routing network, said method comprising:

receiving a message;

sequencing the message at a node of the routing network with other messages received by the routing network to produce an ordering of message delivery within the routing network;

delivering said message to one or more clients of said routing network while maintaining said ordering of message delivery;

wherein said routing network comprises a plurality of routers, and wherein one router of said plurality of routers comprises a sequencing router, said sequencing being performed at said sequencing router of said plurality of routers; and further comprising sending a sequencing acknowledgment from said node to at least one router of said network routing said message, said sending being after said sequencing of said message with other messages received by the routing network, and upon receipt of said sequencing acknowledgment at said at least one router of said network routing said message, delivering said message to a client thereof, said client thereof requiring total ordering of delivery.

11. A system of routing messages within a routing network, said system comprising:

means for receiving a message;

means for sequencing the message at a node of the routing network with other messages received by the routing network to produce an ordering of message delivery within the routing network;

means for delivering said message to one or more clients of said routing network while maintaining said ordering of message delivery; and means for employing said sequencing of said message to ensure a total ordering quality of service of said message to said one or more clients of said network notwithstanding failure of one or more routers or links within said routing network.

12. The system of claim 11, wherein said routing network comprises a plurality of routers, and wherein one router of said plurality of routers comprises a sequencing router, said means for sequencing comprising said sequencing router of said plurality of routers.

13. The system of claim 12, wherein said means for sequencing comprises means for assigning a sequence number to said message at said sequencing router and said means for delivering comprises means for delivering said message to said one or more clients of said routing network using said sequencing number assigned to said message.

14. The system of claim 13, wherein said routing network comprises a spanning tree and said sequencing router comprises one node of said spanning tree.

15. The system of claim 1, wherein said routing network comprises a spanning tree having a plurality of routers, said node sequencing said message comprising a sequencing router within said spanning tree, said system further comprising means for detecting failure of a router within said tree before completing delivery of said message to said one or more clients of said network, and for thereafter reconfiguring said tree to replace said failed router with a new router, and for automatically generating a request for retransmission of a sequencing acknowledgment from said sequencing router, said sequencing acknowledgment being employed to deliver said message in sequence to said one or more clients of said routing network.

16. The system of claim 11, wherein said means for delivering comprises means for routing said message to said one or more clients of said routing network based on data content of said message irrespective of any destination information that may be within said message.

17. The system of claim 16, wherein said means for sequencing comprises means for sending a sequencing acknowledgment to at least one router of said network routing said message, and means for delivering said message to a client thereof upon receipt of said sequencing acknowledgment at said at least one router routing said message, said client requiring total ordering of messages and comprising one client of said one or more clients.

18. The system of claim 17, further comprising means for buffering said message at said at least one router of said network routing said message, said buffering occurring prior to said sequencing of said message.

19. A system of routing messages within a routing network, said system comprising:

means for receiving a message;

means for sequencing the message at a node of the routing network with other messages received by the routing network to produce an ordering of message delivery within the routing network;

means for delivering said message to one or more clients of said routing network while maintaining said ordering of message delivery;

wherein said routing network comprises a plurality of routers, and wherein one router of said plurality of routers comprises a sequencing router, said means for sequencing comprising said sequencing router of said plurality of routers; and further comprising means for sending a sequencing acknowledgment from said node to at least one router of said network routing said message, said sequencing acknowledgment being sent after said sequencing of said message by said means for sequencing, and wherein said system further comprises means for delivering said message to a client of said at least one router of said network routing said message upon receipt of said sequencing acknowledgment, said client requiring total ordering of delivery.

20. A system for routing messages comprising:

a routing network adapted to receive a message;

a sequencer node within said network for sequencing said message with other messages received by the routing network to produce an ordering of message delivery within the routing network;

said network comprising one or more routers for delivering said message to one or more clients of said network, wherein said sequencing of said message occurs prior to delivery of said message to said one or more clients of said network and allows said message to be delivered to said one or more clients while maintaining said ordering of message delivery; and said network being adapted to employ said sequencing of said message to ensure a total ordering quality of service of said message to said one or more clients of said network notwithstanding failure of one or more routers or links within said network.

21. An article of manufacture, comprising:

at least one computer usable medium having computer readable program code means embodied therein for effecting routing of messages within a routing network, the computer readable program code means in the article of manufacture comprising:

computer readable program code means for causing a computer to effect receiving a message;

computer readable program code means for causing a computer to effect sequencing the message at a node of the routing network with other messages received by the routing network to produce an ordering of message delivery within the routing network;

computer readable program code means for causing a computer to effect delivering said message to one or more clients of said network while maintaining said ordering of message delivery; and computer readable program code means for causing a computer to effect employing said sequencing of said message to ensure a total ordering quality of service of said message to said one or more clients of said network notwithstanding failure of one or more routers or links within said routing network.

22. The article of manufacture of claim 21, wherein said routing network comprises a plurality of routers, and wherein one router of said plurality of routers comprises a sequencing router, said computer readable program code means for causing a computer to effect sequencing being performed at said sequencing router of said plurality of routers.

23. The article of manufacture of claim 22, wherein said computer readable program code means for causing a computer to effect sequencing comprises computer readable program code means for causing a computer to effect assigning a sequence number to said message at said sequencing router and said computer readable program code means for causing a computer to effect delivering comprises computer readable program code means for causing a computer to effect delivering said message to said one or more clients of said routing network using said sequencing number assigned to said message.

24. The article of manufacture of claim 21, wherein said computer readable program code means for causing a computer to effect delivering comprises computer readable program code means for causing a computer to effect routing said message to said one or more clients of said routing network based on data content of said message irrespective of any destination information that may be within said message.

25. The article of manufacture of claim 24, wherein said computer readable program code means for causing a computer to effect delivering comprises computer readable program code means for causing a computer to effect delivering said message to said one or more clients of said routing network using said ordering of message delivery notwithstanding failure at one or more routers or links of said routing network.

26. An article of manufacture, comprising:

at least one computer usable medium having computer readable program code means embodied therein for effecting routing of messages within a routing network, the computer readable program code means in the article of manufacture comprising:

computer readable program code means for causing a computer to effect receiving a message;

computer readable program code means for causing a computer to effect sequencing the message at a node of the routing network with other messages received by the routing network to produce an ordering of message delivery within the routing network;

computer readable program code means for causing a computer to effect delivering said message to one or more clients of said network while maintaining said ordering of message delivery;

wherein said routing network comprises a plurality of routers, and wherein one router of said plurality of routers comprises a sequencing router, said computer readable program code means for causing a computer to effect sequencing being performed at said sequencing router of said plurality of routers; and further comprising computer readable program code means for causing a computer to effect sending a sequencing acknowledgment from said node to at least one router of said network routing said message, said sending being after said sequencing of said message by said computer readable program code means for causing a computer to effect sequencing, and said article of manufacture further comprises computer readable program code means for causing a computer to effect delivering said message to a client of said at least one router of said network routing said message upon receipt of said sequencing acknowledgment, said client requiring total ordering of delivery.

* * * * *

UNITED STATES PATENT AND TRADEMARK OFFICE
CERTIFICATE OF CORRECTION

PATENT NO.     : 6,760,340 B1
DATED          : July 6, 2004
INVENTOR(S)    : Banavar et al.

It is certified that error appears in the above-identified patent and that said Letters Patent is hereby corrected as shown below:

Column 12,
Line 4, delete "1" and insert -- 11 --.

Signed and Sealed this

Seventeenth Day of August, 2004

JON W. DUDAS
*Acting Director of the United States Patent and Trademark Office*